United States Patent [19]
Pinnock et al.

[11] Patent Number: 5,473,156
[45] Date of Patent: Dec. 5, 1995

[54] OPTICAL DISPLACEMENT SENSOR USING DUAL REFERENCE REFLECTORS

[75] Inventors: Robert A. Pinnock; Stephen D. Hawker, both of Birmingham; Roger J. Hazelden, Worcestershire; Izumi Sakai, Solihull, all of England

[73] Assignee: Lucas Industries Public Limited Company, England

[21] Appl. No.: 225,377

[22] Filed: Apr. 8, 1994

[30] Foreign Application Priority Data

Apr. 8, 1993 [GB] United Kingdom ............... 9307484

[51] Int. Cl.⁶ ........................................... G01B 11/14
[52] U.S. Cl. ..................... 250/227.11; 250/559.29; 250/559.39; 250/227.21; 356/375
[58] Field of Search ............... 250/561, 227.11, 250/227.14, 227.21, 221, 222.1, 231.1, 578.1, 559.29, 559.39; 385/12, 13; 356/73.1, 375, 4

[56] References Cited

U.S. PATENT DOCUMENTS

| | | | |
|---|---|---|---|
| 4,488,813 | 12/1984 | Kissinger et al. | 356/375 |
| 4,914,290 | 4/1990 | Hilgart et al. | 250/227.30 |
| 5,068,527 | 11/1991 | Iwamoto et al. | 250/227.21 |
| 5,149,963 | 9/1992 | Hassler, Jr. | 250/227.21 |
| 5,223,708 | 6/1993 | Van Deventer | 250/227.23 |

Primary Examiner—Edward P. Westin
Assistant Examiner—John R. Lee
Attorney, Agent, or Firm—Andrus, Sceales, Starke & Sawall

[57] ABSTRACT

An optical displacement sensor comprises first and second optical fibers which transmit light to and receive light reflected from first and second fixed reflectors. A third optical fiber transmits light to and receives light reflected from a moving reflector on the end of a core which moves in response to the displacement to be measured. The intensities of the light reflected to the fibers allows the displacement to be determined with immunity from variations such as in transmissivity and refractive index of a medium between the fibers and the reflectors.

10 Claims, 3 Drawing Sheets

OPTICAL DISPLACEMENT SENSOR USING DUAL REFERENCE REFLECTORS

BACKGROUND OF THE INVENTION

The present invention relates to an optical displacement sensor. Such a sensor may be used in environments where a media in an optical path of the displacement sensor may undergo changes in refractive index and/or optical transmissivity.

U.S. Pat. No. 4,488,813 discloses an optical displacement sensor having two optical probes disposed at different distances X1 and X2 from a movable target. The distance to the target is calculated in accordance with X1=(X1− X2)E1/(E2−E1), where E1 and E2 are the intensities of the reflected light received at the first and second probes, respectively; and (X1−X2) is known from the sensor geometry.

SUMMARY OF THE INVENTION

According to the present invention there is provided an optical displacement sensor, comprising first and second optical paths for transmitting light to and receiving light from first and second reference reflectors, respectively, and a third optical path for transmitting light to and receiving light from a moving reflector.

Preferably the sensor further comprises detecting means for measuring the intensity of the reflected light in each of the optical paths. The detecting means may comprise a light sensitive element for each optical path.

Preferably the sensor further comprises processing means for processing the intensities of the reflected light in order to provide a measurement of the position of the moving reflector.

Preferably the first reference reflector is fixed at a first position and the second reference reflector is fixed at a second position. Advantageously the moving reflector moves between third and fourth positions. The first and second optical paths provide two reference points on a displacement versus intensity characteristic for the moving reflector. The length of the third optical path may vary between the lengths of the first and second optical paths as the moving reflector moves between the third and fourth positions.

The third position may be substantially coincident with the first position. The second position may be substantially half way between the third and fourth positions. Alternatively the moving reflector may move such that the path length of the third optical path varies between substantially the length of the first optical path and at least the length of the second optical path, for example, twice the length of the second optical path.

A first end of a first light guide may provide light to and receive light from the first reference reflector. Advantageously the optical path from the first end of the first light guide to the first reference reflector and back to the first end of the first light guide defines the first optical path.

A first end of a second light guide may provide light to and receive light from the second reference reflector. Advantageously the optical path from the first end of the second light guide to the second reference reflector and back to the first end of the second light guide defines the second optical path.

A first end of a third light guide may provide light to and receive light from the third reflector. Advantageously the optical path from the first end of the third light guide to the third reflector and back to the first end of the third light guide defines the third optical path.

Preferably the first, second and third light guides are first, second and third optical fibres, respectively.

Alternatively one or more of the light guides may be replaced by a path for transmitting light to the respective reflector and a further path for receiving light from the respective reflector.

Preferably the sensor further comprises a light source for supplying light to the first, second and third optical paths. Advantageously a single light source may be used to supply the first, second and third optical paths.

BRIEF DESCRIPTION OF THE DRAWINGS

The present invention will further be described, by way of example, with reference to the accompanying drawings, in which.

DETAILED DESCRIPTION OF THE INVENTION

Figure 1:
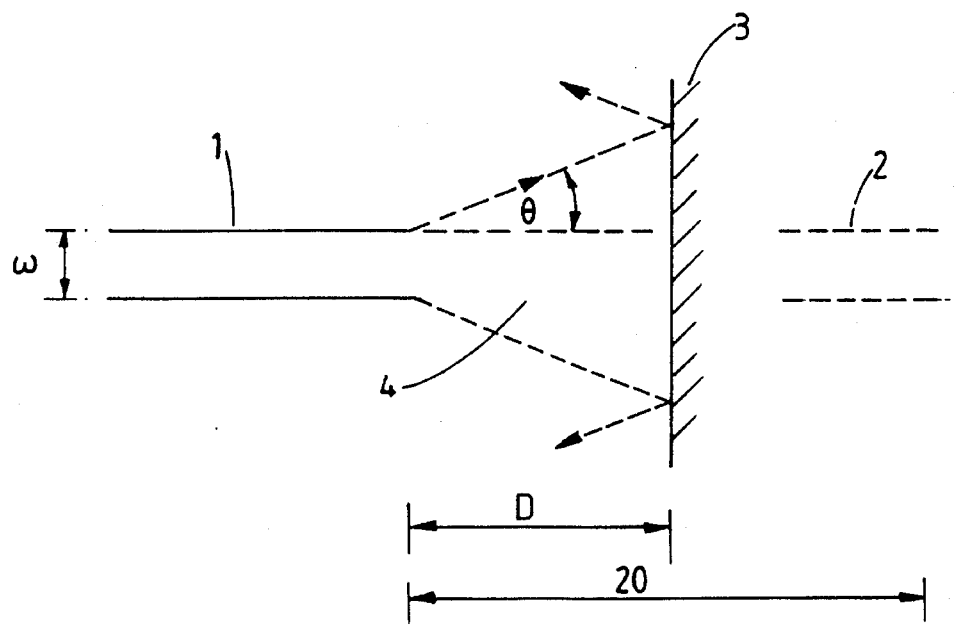
FIG. 1 illustrates the spatial distribution of light from an optical fibre.

Intensity sensitive optical displacement sensors rely on the fact that light emitted from the end of an optical fibre 1 diverges in an approximately conical distribution, the half angle θ of which is related to the numerical aperture NA of the fibre 1 by:

$$NA = \sin \theta$$

The light from the fibre 1 is collected by a sensing fibre 2. The intensity of the light received by the sensing fibre 2 is a function of the separation 2D of the fibres 1 and 2. In practical sensors, the fibre 1 may be configured to act as the sensing fibre 2 by reflecting the light from a reflector 3 so that the light returns to the fibre 1.

The fibre 1 has a finite width w. Consequently, if the distance from the end of the fibre 1 to the reflector 3 is sufficiently small (say of the order of 1 mm), the fibre cannot be approximated by a point source. Thus the spatial distribution of light from the fibre can give rise to irregularities in the intensity versus distance characteristic of a sensor employing the fibre 1.

Furthermore, the distribution of light from the end of the fibre is responsive to the refractive index of the media at the end of the fibre 1. Thus, in a liquid filled sensor, where the space between the end of the fibre 1 and the reflector 3 is filled with a liquid 4, changes in the refractive index of the liquid, for instance due to changes in temperature and/or composition, would cause changes in the numerical aperture of the fibre 1. This in turn would affect the intensity of the light reflected back in to the fibre 1 and give rise to a false measurement of the position of the reflector. Similarly, the sensor is also sensitive to changes in the optical transmissivity of the medium in the optical path. Changes in transmissivity give rise to changes in the intensity of light reflected back into the fibre 1, and thus may be confused with changes in the position of the reflector 3.

Figure 2:
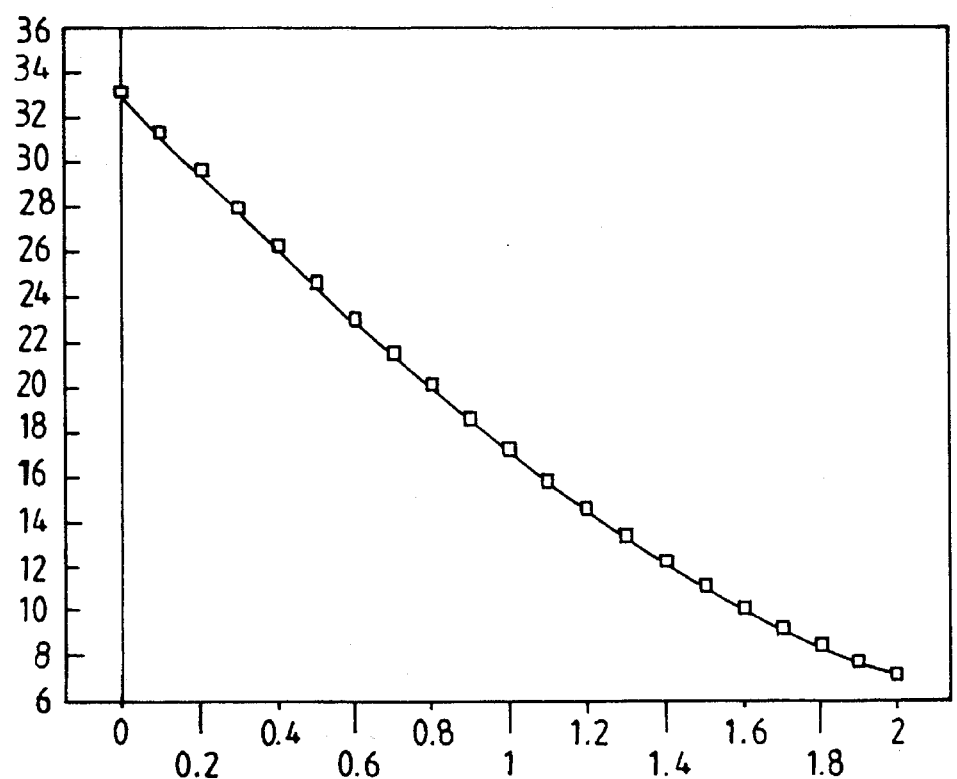
FIG. 2 is an example of an intensity (nanoWatts) versus distance (millimeters) response characteristic of a short stroke displacement sensor using a single fibre.

FIG. 2 shows an example response of a single fibre displacement sensor, of the type shown in FIG. 1, in which the fibre both illuminates and receives light from the reflector 3. The sensor was filled with hydraulic fluid, the fibre was a 400/440 polyamide coated silica fibre having a NA of 0.22 in air, and the illumination was provided by a light emitting diode having a peak intensity around 940 nm.

The sensor response is generally linear for fibre-reflector separations of less than 0.6 mm. The response increasingly deviates from linear as the separation approaches 2 mm. The refractive index of the fluid was kept constant throughout the experiment. However, it should be noted that changes in refractive index would have resulted in changes in reflected light intensity which would be indistinguishable from changes due to movement of the reflector.

Figure 3:
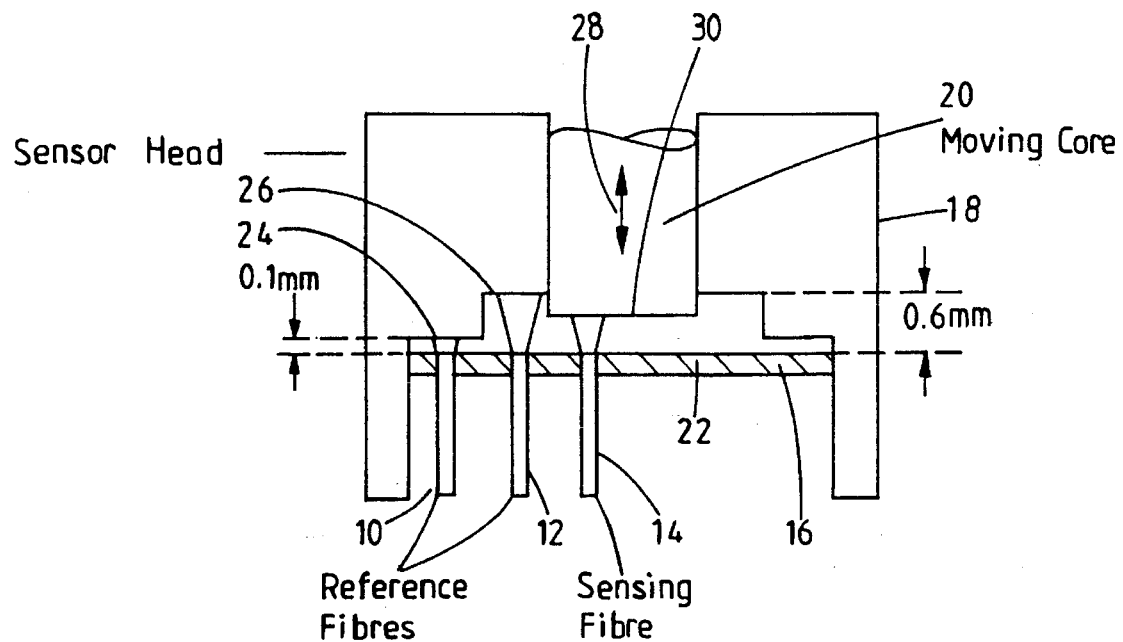
FIG. 3 is a schematic diagram of a sensor constituting an embodiment of the present invention.

The position sensor shown in FIG. 3 has first, second and third optical fibres 10, 12 and 14, respectively, passing in fluid sealed engagement through an end wall 16 of a sensor head 18 having a moving core 20 which is connected to, or an integral part of, an element, such as a control element of a valve, whose displacement is to be measured. The sensor head is in fluid communication with the valve, and thus the spaces within the sensor head become filled with a fluid.

The optical fibres 10, 12 and 14 have respective ends flush or nearly flush with an inner surface 22 of the end wall 16. The sensor head 18 has an internally stepped profile. A first reflector 24, facing the end of the first optical fibre 10, is formed by a first step in the sensor head 18. The separation between the end of the first optical fibre 10 and the first reflector 24 is 0.1 mm. A second reflector 26, facing the end of the second optical fibre 12, is formed by a second step in the sensor head 18. The separation between the end of the second optical fibre 12 and the second reflector is 0.6 mm.

The end of the third optical fibre 14 faces the moving core 20. The moving core 20 undergoes translational movement within the sensor head 18 along the directions indicated by the arrow 28. The movement of the moving core 20 is constrained such that a third reflector 30, formed on the moving core 20, is separated from the end of the third optical fibre 14 by substantially no more than 1.2 mm and no less than 0.1 mm.

Figure 4:
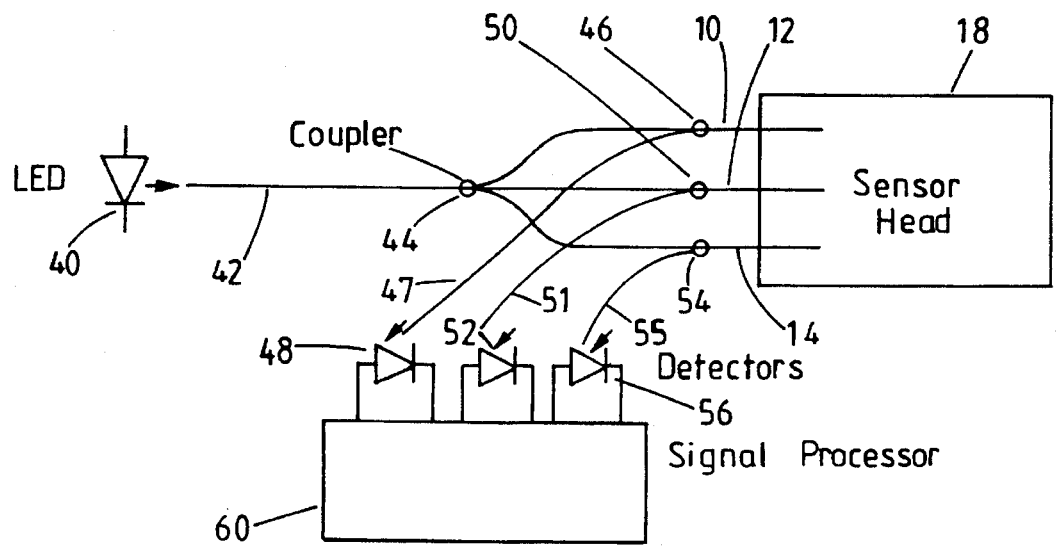
FIG. 4 is a schematic diagram further illustrating the optical system of the embodiment shown in FIG. 3.

As shown in FIG. 4, a light emitting diode 40 supplies light into an fourth optical fibre 42. A first coupler 44 is connected to receive the light in the fourth optical fibre 42 and to supply the light to the first, second and third optical fibres 10, 12 and 14, respectively. A second coupler 46 is arranged to receive light from the first reflector 24 via the first optical fibre 10, and to send the reflected light to a first photodetector 48 via a fifth optical fibre 47. A third coupler 50 is arranged to receive light from the second reflector 26 via the second optical fibre 12 and to send the reflected light to a second photodetector 52 via a sixth optical fibre 51. Similarly, a fourth coupler 54 is arranged to receive light from the third reflector 30 via the third optical fibre 14 and to send the reflected light to a third photodetector 56 via a seventh optical fibre 55. Outputs of the first, second and third photodetectors 48, 52 and 56, are connected to respective inputs of a signal processor 60.

Light from the LED 40 is supplied in substantially equal intensities to the first, second and third optical fibres 10, 12 and 14. The light emitted from the end of the first fibre 10 is reflected from the first reflector 24 and a portion of the reflected light is received by the first optical fibre 10 and conveyed to the first photodetector 48. Similarly light reflected from the second reflector 26 is conveyed to the second photodetector 52, and light reflected from the third reflector 30 is conveyed to the third photodetector 56.

The distances from the ends of the first and second fibres 10 and 12 to the first and second reflectors 24 and 26, respectively, are fixed. Thus the amount of light received by each photodetector is dependent on a fixed distance and the refractive index and/or transmissivity of the fluid in the sensor head 18. The first reflector 24 establishes a first datum at one extreme of travel of the moving core 20 whereas the second reflector 26 establishes a second datum substantially at the midpoint of travel of the moving core 20.

The intensity of the light received by the third optical fibre, and hence at the third photodetector, can be described in terms of the numerical aperture of the fibre, which depends on the refractive index of the fluid, transmissivity of the fluid and displacement of the reflector 30. The first and second data are combined with a generalised response characteristic for the light reflected from the reflector 30 so as to define a characteristic in which the only independent variable is displacement. The response characteristic may be mapped from experiments or may be calculated. For calculation, which is fibre specific, a model of the angular spread of light from the fibre as a function of angle from the fibre axis combining a cylindrical term with a cosine squared term (which in 3 dimensions generate a cylindrical distribution with a superimposed "bell shape") has given satisfactory results within the range of displacements described hereinabove.

The addition of lenses, such as graded index rod lenses, at the ends of the fibres reduces the effective numerical aperture of the fibres, greatly linearises the sensor and, in some applications, may allow the response characteristic to be represented as a straight line.

Figure 5:
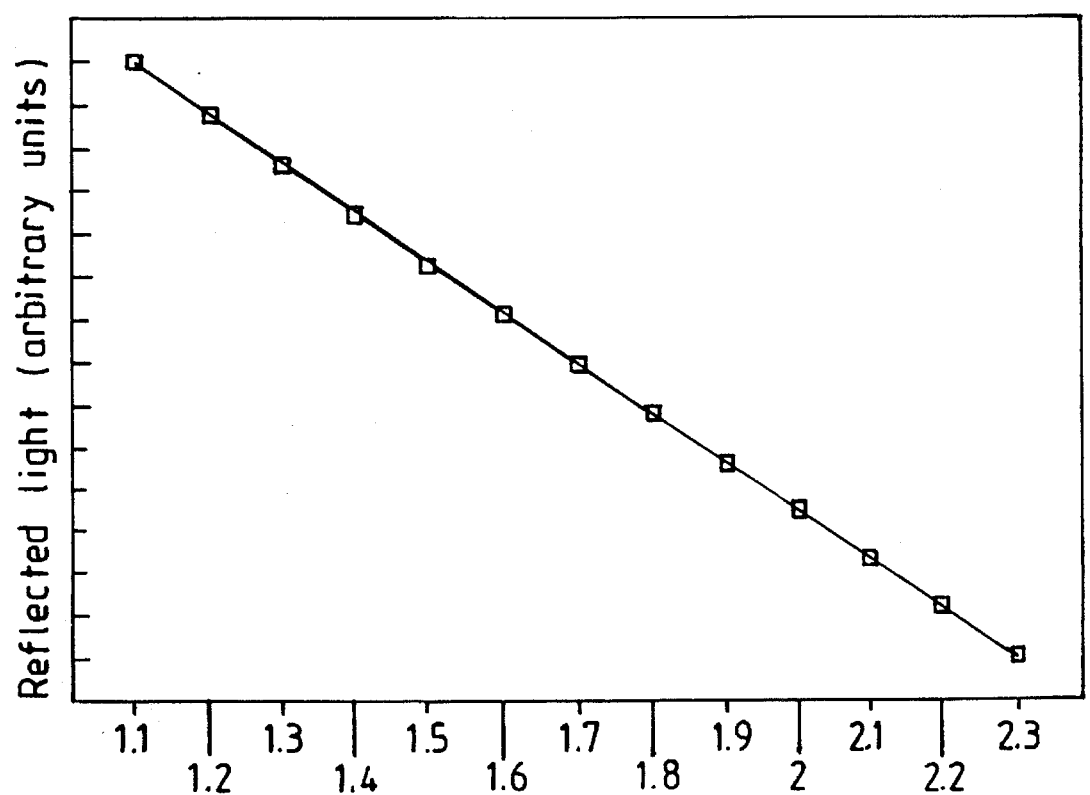
FIG. 5 shows an example of an output (arbitrary units against displacement in millimeters) of a sensor constituting an embodiment of the present invention.

FIG. 5 shows an experimental response curve for a sensor head having lenses abutting each of the first, second and third fibres. The output of the sensor head 18 is substantially linear over the indicated range.

The sensor is calibrated to compensate for differences between the three "channels", for instance in the reflectivity of the first, second and third reflectors 24, 26 and 30 and the sensitivities of the photodetectors 48, 52 and 56. The signal processor 60 may apply individual gains and offsets to the outputs of each of the photodetectors, for example so that the signals from the first and third detectors 48 and 56 match when the reflector 30 is at the first position, and so that the signals from the second and third detectors 52 and 56 match when the reflector 30 is at the second position.

It is thus possible to provide compensation for received light intensity due to changes in refractive index and/or optical transmissivity of a fluid in the optical paths. In experiments, compensation has been achieved for greater than a 3 dB variation in transmissivity and for refractive index changes in the range of 1.00 to 1.46.

We claim:
1. An optical displacement sensor comprising a first reference reflector, first means cooperating with said first reflector to define a first optical path for transmitting light to and receiving light from said first reference reflector to establish a first reference datum, a second reference reflector, second means cooperating with said second reference reflector to define a second optical path for transmitting light to and receiving light from said second reference reflector to establish a second reference datum, a moving reflector responsive to a displacement to be measured, third means cooperating with said moving reflector to define a third optical path for transmitting light to and receiving light from said moving reflector to establish the displacement of said moving reflector relative to said reference data.

2. A sensor as claimed in claim 1, further comprising detecting means for measuring an intensity of reflected light in each of said first, second, and third optical paths.

3. A sensor as claimed in claim 2, in which said detecting means comprise first, second, and third light sensitive elements for receiving light from said first, second, and third optical paths, respectively.

4. A sensor as claimed in claim 2, further comprising processing means for processing the intensity of the reflected light in each of said first, second, and third optical paths to provide a measure of the displacement.

5. A sensor as claimed in claim 1, in which said first and second reference reflectors are fixed at first and second positions, respectively.

6. A sensor as claimed in claim 5, in which said moving reflector is movable between third and fourth positions such that, with said moving reflector at said third position, a length of said third optical path is substantially equal to a length of said first optical path and such that, with said moving reflector at said fourth position, a length of said third optical path is greater than or equal to a length of said second optical path which is greater than the length of said first optical path.

7. A sensor as claimed in claim 6, in which, with said moving reflector at said fourth position, the length of said third optical path is substantially equal to twice the length of said second optical path.

8. A sensor as claimed in claim 1, in which said first, second, and third means comprise first, second, and third light guides, each of which has an end for cooperating with a respective one of said first and second reference reflectors and said moving reflector to define a respective one of said first, second, and third optical paths.

9. A sensor as claimed in claim 8, in which each of said first, second, and third light guides comprises a respective optical fibre.

10. A sensor as claimed in claim 1, further comprising a common light source for supplying light to said first, second, and third optical paths.

\* \* \* \* \*